May 29, 1956     W. P. COFFMAN     2,747,554
AIR INJECTION MEANS FOR AUTOMOTIVE ENGINES
Filed April 8, 1952

INVENTOR
William P. Coffman
BY Frank C. Kerman
ATTORNEY

United States Patent Office 2,747,554
Patented May 29, 1956

2,747,554

AIR INJECTION MEANS FOR AUTOMOTIVE ENGINES

William P. Coffman, Saginaw, Mich.

Application April 8, 1952, Serial No. 281,130

14 Claims. (Cl. 123—25)

The present invention relates to air injection means for automotive engines, and in particular to a device for supplying a vaporized mixture of a liquid such as water, fuel oil, alcohol, kerosene, etc. and air to the intake manifold of an internal combustion engine in metered or controlled amounts governed by the rise and fall in pressure conditions in the intake manifold.

One object is to provide a device which will inject vapor into the fuel-air mixture at certain engine speeds to provide excess air which will cool the products of combustion by the addition of hydrogen to the fuel-air mixture, and thereby reduce the carbon dioxide content of the exhaust gases such as to reduce back pressure and provide smooth engine operation.

Another object is to provide a device for injecting vaporized and atomized mixtures of air and a liquid in metered quantities to the fuel-air mixture of the engine to thereby reduce fuel consumption by providing excess air at increased engine speeds.

Another object is to provide a device for supplying additional vaporized and moistened air to the air-fuel mixture of an internal combustion engine, which vaporized and atomized air and liquid mixture is formed by heat given off from the exhaust manifold, and is metered or controlled in its passage to the intake manifold of the engine by pressure conditions existing therein at varying engine speeds and varying loads.

Another object is to provide a device of the above-mentioned type which is adapted to supply warm, moist air to the fuel-air mixture of the internal combustion engine to pre-heat the fuel-air mixture from the carburetor and provide a more combustible fuel mixture.

Another object is to provide an air injection device for internal combustion engines which can be conveniently and quickly installed on various makes of engines used in motor vehicles, and which will operate efficiently to control the admission of excess air to the fuel-air mixture in proportion to the engine speed and governed by the pressure conditions in the intake manifold.

Another object is to provide an air injection device for internal combustion engines for supplying the fuel-air mixtures thereof with excess moistened warm air which will increase the motor vehicle mileage without effecting engine operation and performance at various speeds.

Other objects and advantages of the invention will become apparent during the course of the following description of the accompanying drawing, wherein.

Figure 1:
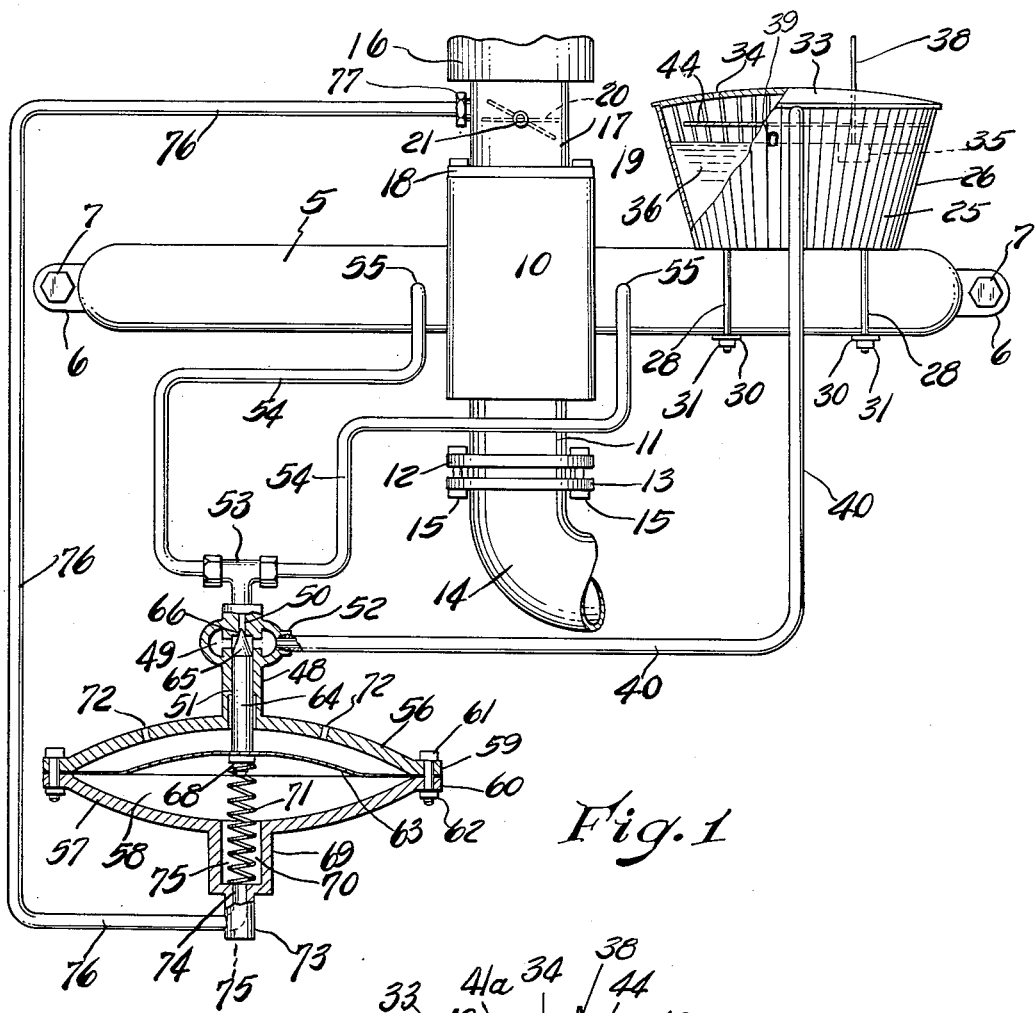
Figure 1 is a fragmentary, side elevational view showing the air injection device which is supported on an intake manifold in heat conduction relation with the exhaust manifold of an internal combustion engine, and showing the pressure control valve for governing the admission of heated, moistened air to the fuel-air mixture, the exhaust manifold and exhaust pipes being omitted from the view.

In the drawing and more in detail, there is shown for the purpose of convenience of illustration, an intake manifold 5 for an internal combustion engine (not shown), having the usual lugs at the ends thereof as at 6 for being bolted to the engine block by machine screws or the like 7.

The manifold 5 is provided with a series of spaced-apart outlets as usual which communicate with intake ports in the engine block for the individual cylinders. An exhaust manifold 8 is mounted rearwardly of the intake manifold 5 and is provided with the usual exhaust pipes 9 for conducting the burned products of combustion from the combustion chambers of the engine to the atmosphere through a single exhaust pipe.

A heater 10 is integrated with the intake manifold 5 and is provided at its lower end with an extension 11 having a flange 12 for receiving the coupling flange 13 of a pipe 14 connected to the exhaust manifold pipe 9 in the usual manner to supply heated air to the intake manifold connection between the carburetor and said manifold. Threaded fasteners 15 are provided for connecting the flanges 12 and 13, and the warm air outlet from the heater 10 is not shown. The heater 10 is adapted to permit the hot combustion gases to pass around a portion of the intake manifold and thus pre-heat the fuel-air mixture.

Mounted on the upper end of the heater 10 is a carburetor 16 of the down-draft type, having a tubular extension 17 which is flanged as usual as at 18 and bolted to the heater by machine screws or the like 19. A butterfly valve 20 is mounted in the extension 17 on a shaft 21, which has its ends journaled in suitable bearing openings and one end of the shaft 21 is provided with a lever which is controlled by the accelerator pedal of the vehicle. The extension 17 communicates with an interior pipe spaced from the heater jacket 10 to conduct the fuel-air mixture to the intake manifold 5 in a conventional manner, and in such proportions to produce the desired engine speed by the regulation of the butterfly valve 20.

Figure 2:
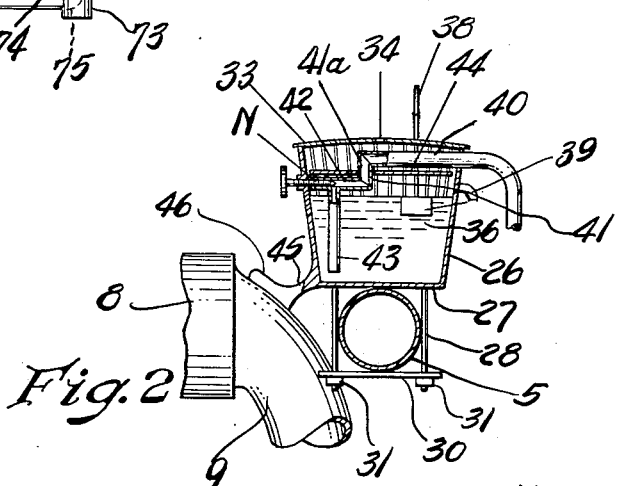
Figure 2 is a fragmentary, sectional view of the reservoir for supplying the warm, moistened air in a vaporized condition to the fuel-air mixture in the intake manifold, the reservoir being shown in heat conduction relation with the exhaust manifold pipe of the internal combustion engine.

The above structure is conventional in the intake and exhaust manifold arrangement in present-day internal combustion engines employed in motor vehicles. The invention consists of a reservoir 25 having downwardly and inwardly inclined walls 26 at the side and ends thereof which are connected at the lower ends by a bottom wall 27. The reservoir 25 is provided with a pair of spaced sets of anchoring bolts 28 at each end thereof, which are adapted to straddle the intake manifold 5 (Figure 2), so as to be held in place by clamping plates 30 and retaining nuts 31 which are received on correspondingly threaded end portions of the bolts 28. The reservoir 25 has its side and end walls 26 corrugated to reinforce the same, and to provide a structure which will not break should the water therein freeze when the vehicle is left standing for long periods of time.

The reservoir 25 is provided with a removable cover 33 which is adapted to be frictionally held in place, and the cover is provided with a vent opening 34 for the entrance of air thereto. A float indicator is provided and includes a buoyant member 35 which is adapted to float on the surface of the liquid 36 within the reservoir 25, and said float 35 is provided with an indicator rod 38 which extends upwardly through an opening in the cover 33 to provide a visual indication of the contents of the reservoir.

Mounted in one of the side walls of the reservoir 25 is an overflow pipe 39 for draining excess liquid from the reservoir, and a supply pipe 40 projects into reservoir 25 and is formed with a stepped section 41 communicating with the section 42. An opening 41a is provided in section 41 and a vertical intake pipe 43 opens into the section 42 and has its lower end submerged in the liquid 36. A needle valve N is threaded in the side wall of the reservoir and controls the opening into section 42, all as clearly shown in Figure 2 of the drawing, and as the liquid 36 is heated, the valve N controls the volume of moist air drawn into the supply pipe 40. To limit splash and sloppage in the reservoir, I provide a baffle 44 spaced above the level of the liquid.

In order to heat the water 36 in the reservoir 26, one or more extensions 45 are provided on one of the walls 26 of the reservoir, and said extensions are provided with enlarged foot portions 46 adapted to engage a portion of one of the exhaust pipes 9. Thus, the reservoir 26 is heated by conduction as well as convection currents, since the reservoir is mounted adjacent and above the exhaust pipe 8.

In order to control the flow of moist warm air to the intake manifold 5, the supply pipe 40 is connected to a pressure responsive regulator valve which includes a casing 48 having a chamber 49 provided with axially aligned bores 50 and 51. The supply pipe 40 is coupled to the valve chamber 49 of the casing 48 by a threaded fitting or coupling, and if desired, the end of the pipe 40 may be threaded for being received in an internally threaded bore in a tubular boss 52 of the chamber 49. The valve chamber 49 is provided with a T-fitting 53 which communicates with the bore 50, and connected to the T-fitting 53 and to the opposite arms thereof is a pair of feeder pipes 54 which extend into the manifold 5 on opposite sides of the heater 10. Thus, by arranging the pipe 54 to project into the intake manifold 5 at spaced locations 55, the fuel-air mixture passing through the intake manifold will be more evenly co-mingled with the warm, moist excess air supplied from the reservoir 25.

Supported on the lower end of the valve casing 48 is a pressure responsive device, including an upper casing section 56 and a lower casing section 57. The casing sections 56 and 57 are dished to provide a chamber 58 therebetween and the marginal edges are flanged as at 59 and 60 for receiving circumferentially spaced clamping bolts 61 which are held in place by retaining nuts 62. Sandwiched between the flanges 59 and 60 is a flexible diaphragm 63 which is held in place by the clamping bolts 61 and retaining nuts 62 as usual.

Slidably mounted in the bore 51 of the valve casing 48 is a reciprocating valve member 64 having a needle valve 65 on the end thereof which is adapted to seat on an annular projection 66 in the valve chamber 47 surrounding the bore 50. Thus, the reciprocating plug valve 64 will control the passageway 50 and will regulate the amount of warm, moist air from the reservoir 25 to the intake manifold 5. The lower end of the plug valve 64 is reduced and threaded and extends through a central aperture in the disc 63 so as to be held in place by a retaining nut 68. Fluctuations of the diaphragm 63 will cause the needle valve 65 to be seated and unseated to control the passageway 50.

Formed in the lower casing section 57 of the pressure regulator is an annular enlarged portion 69 which is provided with a central bore 70 for receiving one end of a coil spring 71. The opposite end of the coil spring is arranged in encircling relation with the lower end of the plug valve 64 to normally urge said valve in a closed position and close the fluid flow pathway between the reservoir 25 and intake manifold 5.

An extension 73 is formed on the annular enlarged portion 69 of the lower regulator casing section 57, and said extension is provided with a central bore 74 which terminates in a lateral bore 75 having internal threads for receiving the correspondingly threaded end of a pipe 76. The other end of the pipe 76 is provided with a threaded nipple 77 which is adapted to be inserted in the outlet extension 17 of the carburetor 16 at a point slightly above the butterfly valve 20 and its pivotal mounting 21.

Vent openings 72 are formed in the upper regulator section 56 to permit the diaphragm 63 to flex when the pressure in the chamber 58 falls below sub-atmospheric pressure. Thus, when the pressure in the chamber 58 is reduced below 14.7 pounds per square inch, the diaphragm 63 will be moved downwardly against the yielding coil spring 71 and open the valve 64.

In operation, the unit is installed on the manifold of an internal combustion engine with the feet 46 in heat conduction relation with the exhaust manifold pipe 9. As the temperature of the engine increases after starting, from a cold state, the water 36 will likewise be increased in temperature such as to produce a vapor condition in the intake pipe. While the engine is being operated at relatively slow speeds under a load, the pressure drop in the chamber 58 will not be sufficient to move the diaphragm 63 and needle valve 65 in a direction to permit vapor flow from the reservoir 25 to the intake manifold 5. However, when the vehicle is operating such that the motor is operating at high speeds with the load reduced, the pressure drop in the chamber 58 will be below the sub-atmospheric pressure and will cause the diaphragm 63 to move downwardly against the action of the coil spring 71 and unseat the needle valve 65, and permit the warm atomized vapor intermingled with air passing through the opening 34 to be drawn into the intake manifold 5 through the supply pipes 54.

The coil spring 71 is constructed such as to permit a pressure drop in the chamber 58 within certain limits to open the valve 64, but yet maintain said valve 64 closed when the pressure drop is not appreciably below atmospheric pressure. In addition, the butterfly valve 20 is located beneath the coupling 77 such that when the engine is idling, the pressure drop in the chamber 58 will be insufficient to overcome the tension of the coil spring 71 and prevent the valve 65 from opening.

It will thus be seen that by supplying the fuel-air mixture with excess air at various speeds, considerable fuel will be saved due to the added hydrogen, and also that the engine will operate smoother by reason of the cooled condition of the exhaust products.

It is well-known that complete combustion of fuel depends upon the air supplied, and in internal combustion engines, the fuel-air mixture is varied by the carburetor. However, at certain engine speeds, more complete combustion is obtained by supplying excess air since most carburetors are regulated to supply a fixed minimum amount of air to the fuel such as gasoline or the like. Due to imperfect mixing of the fuel-air mixture at high speeds, it is necessary to supply excess air in order to prevent the loss of power through incompleteness of combustion.

It is to be understood that the form of the invention herewith shown and described is to be taken as a preferred example thereof, and that various changes may be resorted to in the shape, size, and arrangement of parts, without departing from the spirit of the invention or the scope of the subjoined claims.

What I claim is:

1. In combination with the intake and exhaust manifolds of an internal combustion engine providing a pair of flow paths for conducting a fuel-air mixture to the engine and discharging exhaust gases therefrom respectively, a reservoir adapted to contain a liquid mounted in heat transfer relation with the exhaust manifold and adapted to be heated by the exhaust gases traveling along the flow path thereof, said reservoir being provided with inclined corrugated side walls and a horizontal baffle in the upper portion thereof, a closed delivery pipe projecting into said chamber, an intake pipe opening into the delivery pipe and open to said liquid, said delivery pipe conducting vapor to the fuel-air mixture passing along the flow path of said intake manifold, and a pressure responsive valve interposed in said delivery pipe and responsive to sub-atmospheric pressures in the intake manifold and fuel-air mixture pathway to control said vapor passing to said intake manifold.

2. In combination with the intake and exhaust manifolds of an internal combustion engine providing a pair of flow paths for conducting a fuel-air mixture to the engine and discharging exhaust gases therefrom respectively, a reservoir supported on the intake manifold and arranged in heat transfer relation with the exhaust manifold so that liquid in said reservoir will be heated by the exhaust gases passing along the exhaust gas flow path, said reservoir being provided with a baffle wall in the upper portion thereof, a closed delivery pipe projecting into said vapor chamber for delivering vapor to the fuel-air mixture passing along the flow path in the intake manifold, means for admitting vapor to said pipe, a valve interposed in said delivery pipe, a pressure responsive diaphragm for actuating said valve in response to sub-atmospheric pressures in the intake manifold.

3. In combination with the intake and exhaust manifolds of an internal combustion engine providing a pair of flow paths for conducting a fuel-air mixture to the engine and discharging exhaust gases therefrom respectively, a reservoir mounted in heat transfer relation with the exhaust manifold adapted to contain a liquid to be heated by exhaust gases passing along said flow path, a closed delivery pipe connected to the upper end of said reservoir, means establishing communication between said delivery pipe and the liquid in the reservoir for feeding steam vapor to the fuel-air mixture flow path in the intake manifold, and a regulator valve interposed in said delivery pipe having a spring loaded diaphragm for controlling said valve, said diaphragm being responsive to sub-atmospheric pressures in the fuel-air mixture flow path of the intake manifold to control the flow of steam vapor from the reservoir to the manifold.

4. In combination with the intake and exhaust manifolds of an internal combustion engine providing a pair of flow paths for conducting a fuel-air mixture to the engine and discharging exhaust gases therefrom respectively, a reservoir mounted in heat transfer relation with the exhaust manifold adapted to contain a liquid to be heated by exhaust gases passing along the flow path of said exhaust manifold, a float indicator in said reservoir to indicate the liquid level therein, said reservoir being provided with resilient corrugated side walls to reinforce the same and prevent breakage through freezing, a closed delivery pipe extending into the upper end of said reservoir, means establishing communication between the pipe and liquid in the reservoir, for conducting steam vapor to the flow path of the intake manifold, a regulator valve interposed in said delivery pipe and a pressure responsive diaphragm for controlling said valve responsive to sub-atmospheric pressures in the intake manifold.

5. In combination with the intake and exhaust manifolds of an internal combustion engine providing a pair of flow paths for conducting a fuel-air mixture to the engine, and discharging exhaust gases therefrom respectively, means for delivering steam vapor to the fuel-air mixture flow path, and means for controlling the rate of flow of said steam vapor comprising a regulator valve including a reciprocating valve plug, a diaphragm connected to said plug and adapted to be actuated in response to sub-atmospheric pressures in the intake manifold, and a coil spring of predetermined resiliency to normally hold said valve in a closed position when the pressure drop in said intake manifold is above a predetermined limit.

6. In combination with an internal combustion engine having an intake manifold to provide a fuel-air mixture flow path to the engine, means for delivering air to said flow path to mingle with said fuel-air mixture, and pressure responsive valve means responsive to sub-atmospheric pressures in the intake manifold for controlling said air delivering means, said valve means including a reciprocating needle valve interposed in the delivery means, a diaphragm directly connected to said needle valve and responsive to sub-atmospheric pressures in the intake manifold for moving said valve to an open position, and a coil spring of predetermined compressional strength to urge said needle valve in a closed position when the pressure drop in the intake manifold is slightly beneath atmospheric pressure.

7. In combination with the intake and exhaust manifolds of an internal combustion engine providing a pair of flow paths for conducting a fuel-air mixture to the engine and discharging exhaust gases therefrom respectively, a reservoir partially filled with a liquid mounted in heat transfer relation with the exhaust manifold, a supply pipe leading to the intake manifold extending into said reservoir above the level of said liquid therein, an extension pipe for said supply pipe extending below the surface of said liquid and open thereto, and means for controlling the flow of vapor from said extension into said supply pipe for delivering a predetermined quantity of vapor to the intake manifold, and pressure responsive valve means in said supply pipe normally closing the same to said intake manifold system responsive to a sub-atmospheric pressure in the intake manifold to admit a controlled flow of vapor therethrough to said intake system.

8. In combination with the intake and exhaust manifold systems of an internal combustion engine providing a pair of flow paths for conducting a fuel-air mixture to the engine and discharging exhaust gases therefrom respectively, a reservoir partially filled with a liquid mounted adjacent the exhaust manifold, a delivery pipe to the intake manifold system extending into said reservoir and open to the admission of vapor above the level of liquid therein, means maintaining the liquid in said reservoir below a predetermined level, and means in said delivery pipe normally closing the same to said intake manifold system responsive to pressures in said intake manifold system to permit the controlled flow of vapor through said delivery pipe to said intake manifold system.

9. The combination defined in claim 8 in which said means maintaining the liquid below a predetermined level in said reservoir includes an overflow outlet in said reservoir.

10. The combination defined in claim 8 in which said means maintaining the liquid in said reservoir below a predetermined level includes a baffle plate covering all but a small portion of the surface of said liquid.

11. The combination defined in claim 8 in which said reservoir is formed with corrugated side walls.

12. The combination defined in claim 8 in which a float indicator having a measuring rod extending up through the top of said reservoir is provided therein.

13. In combination with the intake and exhaust manifold systems of an internal combustion engine providing a pair of flow paths for conducting a fuel-air mixture to the engine and discharging exhaust gases therefrom respectively, a closed reservoir partially filled with a liquid, a delivery pipe to the intake manifold system extending into said reservoir above the level of liquid therein and open to the admission of vaporized liquid, an air port in said reservoir above the level of liquid therein open to atmosphere, and means in said delivery pipe normally closing the same to said intake manifold system responsive to pressures in said intake manifold system to permit the controlled flow of vapor through said pipe thereto.

14. In combination with the intake and exhaust manifold systems of an internal combustion engine providing a pair of flow paths for conducting a fuel-air mixture to the engine and discharging exhaust gases therefrom respectively, a delivery pipe leading to said intake manifold system, a diaphragm type regulator comprising a pair of oppositely disposed plates having a diaphragm interposed therebetween, one of said plates having a tubular extension opening into an enlarged head portion with an annular chamber therein and a passage of restricted diameter leading out of the end thereof, said annular chamber encircling said extension and communicating with said passage of restricted diameter, a needle valve carried by said diaphragm and normally seated in said passage of restricted width to prevent flow from said chamber to said passage, a port in the head portion of the one plate opening directly into the annular chamber therein and admitting air and vapor thereto, said plate extension having also ports therein admitting air to one side of said diaphragm, and a pipe communicating with the intake manifold system and leading to the opposite side of said diaphragm so that said needle valve will be withdrawn when the pressures in said intake system are sub-atmospheric and air and vapor will be admitted from said chamber to said passage.

References Cited in the file of this patent

UNITED STATES PATENTS

| | | |
|---|---|---|
| 1,543,681 | Schoonmaker | June 30, 1925 |
| 1,727,197 | Bryan et al. | Sept. 3, 1929 |
| 2,052,327 | Waters et al. | Aug. 25, 1936 |
| 2,591,272 | Littlejohn et al. | Apr. 1, 1952 |